US012561095B2

(12) United States Patent
Gajendiran et al.

(10) Patent No.: US 12,561,095 B2
(45) Date of Patent: Feb. 24, 2026

(54) TRANSFERRING VALID DATA USING A SYSTEM LATCH

(71) Applicant: Micron Technology, Inc., Boise, ID (US)

(72) Inventors: Gowrishankar Gajendiran, Bangalore (IN); Amiya Banerjee, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/523,478

(22) Filed: Nov. 29, 2023

(65) Prior Publication Data

US 2024/0176550 A1     May 30, 2024

Related U.S. Application Data

(60) Provisional application No. 63/385,482, filed on Nov. 30, 2022.

(51) Int. Cl.
G06F 3/06 (2006.01)
(52) U.S. Cl.
CPC .......... G06F 3/0659 (2013.01); G06F 3/0619 (2013.01); G06F 3/064 (2013.01); G06F 3/0679 (2013.01)
(58) Field of Classification Search
None
See application file for complete search history.

(56) References Cited

U.S. PATENT DOCUMENTS

| 2014/0245098 A1* | 8/2014 | Sharon | H03M 13/2942 |
| | | | 714/755 |
| 2015/0120986 A1* | 4/2015 | Tuers | G06F 3/0604 |
| | | | 711/102 |
| 2016/0011779 A1* | 1/2016 | Lee | G11C 16/08 |
| | | | 711/103 |
| 2016/0092128 A1* | 3/2016 | Jain | G06F 3/0647 |
| | | | 711/103 |
| 2016/0218740 A1* | 7/2016 | Parthasarathy | G11C 29/00 |
| 2018/0046405 A1* | 2/2018 | Hush | G06F 3/0647 |
| 2020/0098436 A1* | 3/2020 | Kim | G11C 16/3445 |
| 2021/0149583 A1* | 5/2021 | Agarwal | G06F 3/064 |
| 2021/0389878 A1* | 12/2021 | Lindberg | G06F 3/0659 |

* cited by examiner

*Primary Examiner* — Jared I Rutz
*Assistant Examiner* — Alexander J Yoon
(74) *Attorney, Agent, or Firm* — Holland & Hart LLP

(57) ABSTRACT

Methods, systems, and devices for transferring valid data using a system latch are described. The operations described herein may include sensing valid data across a first set of planes associated with a first set of memory blocks of a non-volatile memory system. In response to sensing the valid data, the valid data may be stored to a latch of the non-volatile memory system based on an order of sensing the valid data across the first set of planes. The valid data may be written across a second set of planes associated with a second set of memory blocks of the non-volatile memory system based on the order of sensing the valid data across the first set of planes. In some cases, writing the valid data from the latch may be based on determining that a threshold associated with a duration corresponding to sensing the valid data has been satisfied.

14 Claims, 6 Drawing Sheets

Figure 3:
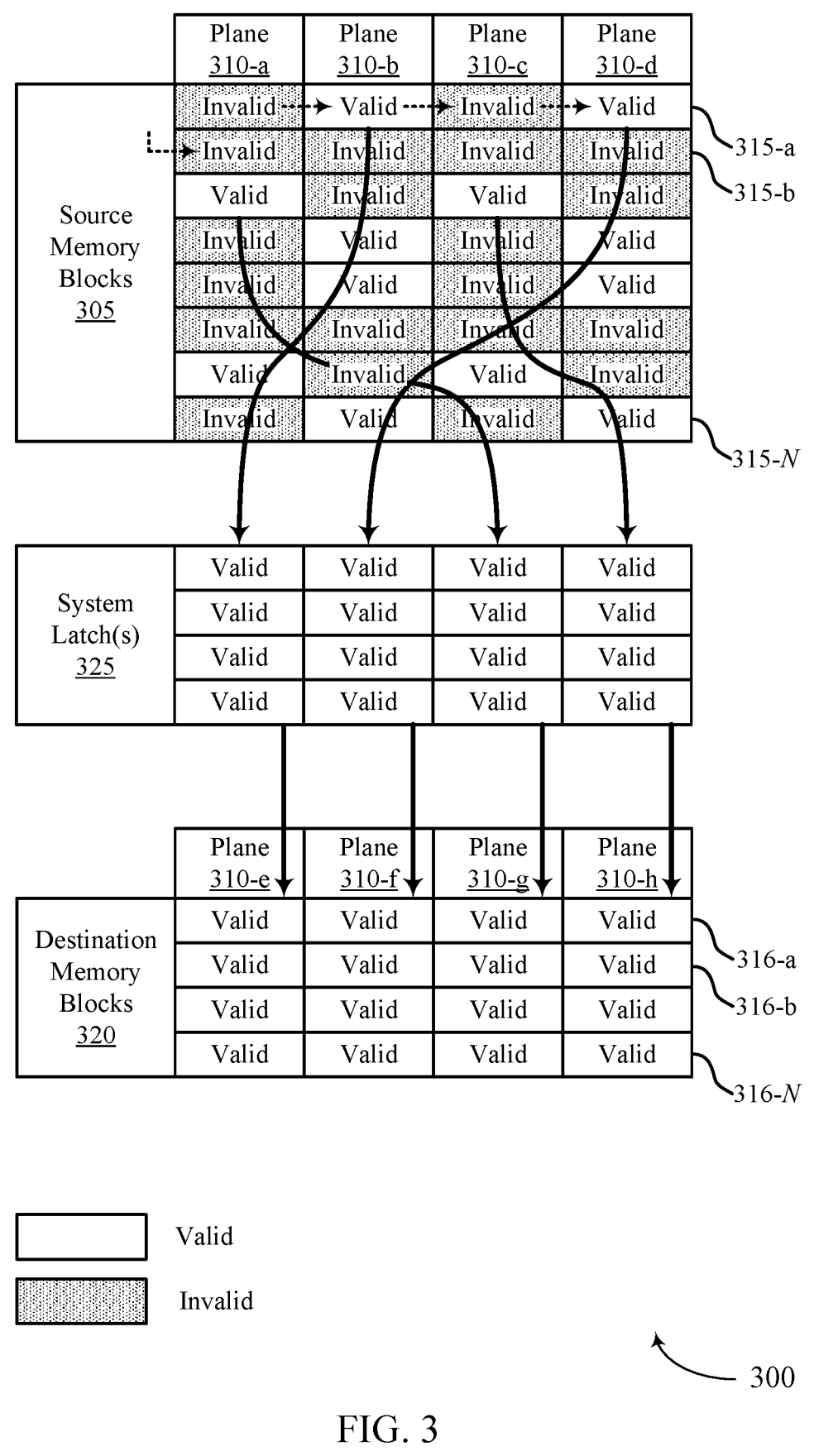

| | Plane 310-a | Plane 310-b | Plane 310-c | Plane 310-d | |
|---|---|---|---|---|---|
| | Invalid | Valid | Invalid | Valid | |
| | Invalid | Invalid | Invalid | Invalid | 315-a |
| | Valid | Invalid | Valid | Invalid | 315-b |
| Source Memory Blocks 305 | Invalid | Valid | Invalid | Valid | |
| | Invalid | Valid | Invalid | Valid | |
| | Invalid | Invalid | Invalid | Invalid | |
| | Valid | Invalid | Valid | Invalid | |
| | Invalid | Valid | Invalid | Valid | 315-N |

| | | | | |
|---|---|---|---|---|
| | Valid | Valid | Valid | Valid |
| System Latch(s) 325 | Valid | Valid | Valid | Valid |
| | Valid | Valid | Valid | Valid |
| | Valid | Valid | Valid | Valid |

| | Plane 310-e | Plane 310-f | Plane 310-g | Plane 310-h | |
|---|---|---|---|---|---|
| Destination Memory Blocks 320 | Valid | Valid | Valid | Valid | |
| | Valid | Valid | Valid | Valid | 316-a |
| | Valid | Valid | Valid | Valid | 316-b |
| | Valid | Valid | Valid | Valid | 316-N |

□ Valid

▨ Invalid

Access source block

410

Sense data in source block

415

Determine if data is valid

Yes         No

420

Store valid data to system latch

435

Access next source block

425

Determine if system latch threshold is satisfied

No

Yes

430

Write data to destination block(s)

440

Sense data in next source block

400

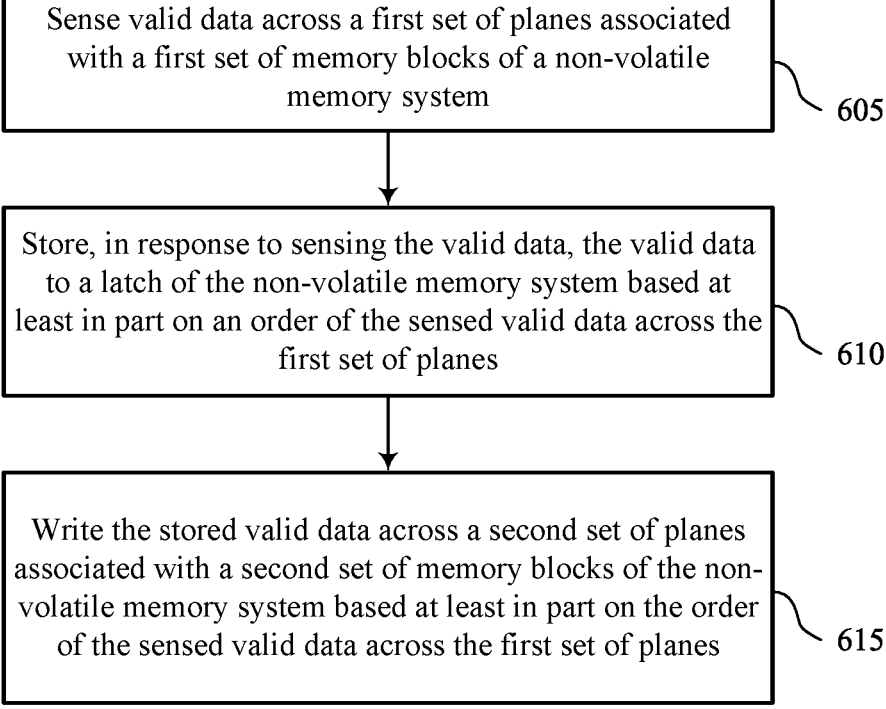

Sense valid data across a first set of planes associated with a first set of memory blocks of a non-volatile memory system

605

Store, in response to sensing the valid data, the valid data to a latch of the non-volatile memory system based at least in part on an order of the sensed valid data across the first set of planes

610

Write the stored valid data across a second set of planes associated with a second set of memory blocks of the non-volatile memory system based at least in part on the order of the sensed valid data across the first set of planes

TRANSFERRING VALID DATA USING A SYSTEM LATCH

CROSS REFERENCE

The present Application for Patent claims priority to and the benefit of U.S. Provisional Application No. 63/385,482 by Gajendiran et al., entitled "TRANSFERRING VALID DATA USING A SYSTEM LATCH," filed Nov. 30, 2022, assigned to the assignee hereof, and expressly incorporated by reference in its entirety herein.

FIELD OF TECHNOLOGY

The following relates to one or more systems for memory, including transferring valid data using a system latch.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIG. 3 illustrates an example of a data transfer diagram that supports transferring valid data using a system latch in accordance with examples as disclosed herein.

FIG. 6 illustrates a flowchart showing a method or methods that support transferring valid data using a system latch in accordance with examples as disclosed herein.

DETAILED DESCRIPTION

Figure 1:
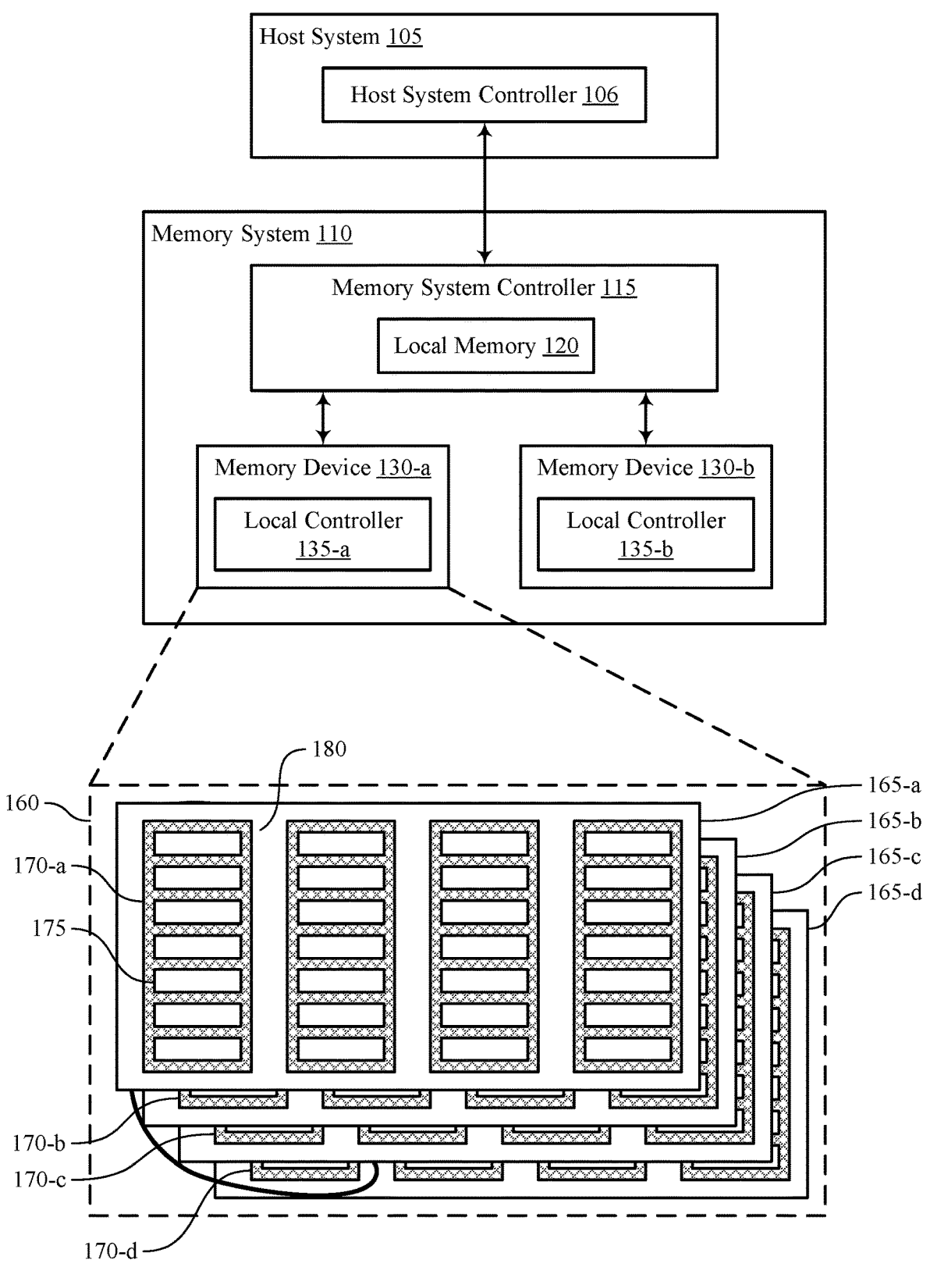
FIG. 1 illustrates an example of a system that supports transferring valid data using a system latch in accordance with examples as disclosed herein.

A memory system may transfer data between memory blocks of the memory system. For example, a memory system may transfer data from source memory blocks to destination memory blocks using a copy-back technique, in which data is copied from the source memory blocks to the destination memory blocks. In such cases, data may be transferred from the source memory blocks to the destination memory blocks regardless of the type of data (e.g., whether the data is valid data or invalid data), such that fragmented data (e.g., a nonsequential pattern of valid data or a mix of invalid and valid data) may be transferred from the source memory blocks to the destination memory blocks. In some examples, valid data may be a most recent version of data being stored in memory blocks of the memory system, and invalid data may be an outdated version of data due to a more recent or updated version of the data being stored in memory blocks of the memory system. In some cases, transferring the fragmented data using other different copy-back techniques may result in invalid data being written to the destination memory blocks. In some implementations, the memory system may use a controller to sense data from the source memory blocks and identify the valid data to be written to the destination memory blocks. However, using the controller in this way will consume bandwidth of the memory system and adversely impact latency for performing other operations of the memory system.

In accordance with examples as described herein, transferring (e.g., copying to destination memory blocks) data (e.g., valid data) using a system latch will ensure invalid data is not written to destination memory blocks of a memory system and mitigate adversely impacting bandwidth and latency of the memory system. An improved copy-back technique may include accessing source memory blocks of the memory system and sensing valid data from the source memory blocks. The valid data may be stored to the system latch in an order according to the valid data sequentially sensed from the source memory blocks, regardless of an order of the source memory blocks. The system latch may store the valid data until a storage capacity of the system latch is met, some threshold is met, or until all the valid data is sensed from the source memory blocks. Then, the valid data may be written from the system latch to the destination memory blocks. Examples of the source memory blocks and the destination memory blocks may include single-level cells (SLCs), triple-level cells (TLCs), quad-level cells (QLCs), or any combination thereof, such that the valid data is folded (e.g., compressed) before writing the valid data to the destination memory blocks. The improved copy-back technique described herein may prevent invalid data from being written to the destination memory blocks without using a controller of the memory system, thereby preventing reduced usable bandwidth (e.g., for performing other operations) and increased latency otherwise associated with transferring valid data from source memory blocks to destination memory blocks (e.g., using an existing copy-back technique).

In addition to applicability in memory systems as described herein, techniques for transferring valid data using a system latch may be generally implemented to improve the performance of various electronic devices and systems. Some electronic device applications, including high-performance and/or high-integrity applications or memory systems, include examples in which improved performance and/or information integrity is desired. As such, improving the performance of the devices and/or systems, and/or improving the integrity of the information stored by transferring data using a system latch may improve user experience and/or ensure invalid data is not written to destination memory blocks of a memory system and will mitigate adversely impacting bandwidth and/or latency of the memory system.

Figure 2:
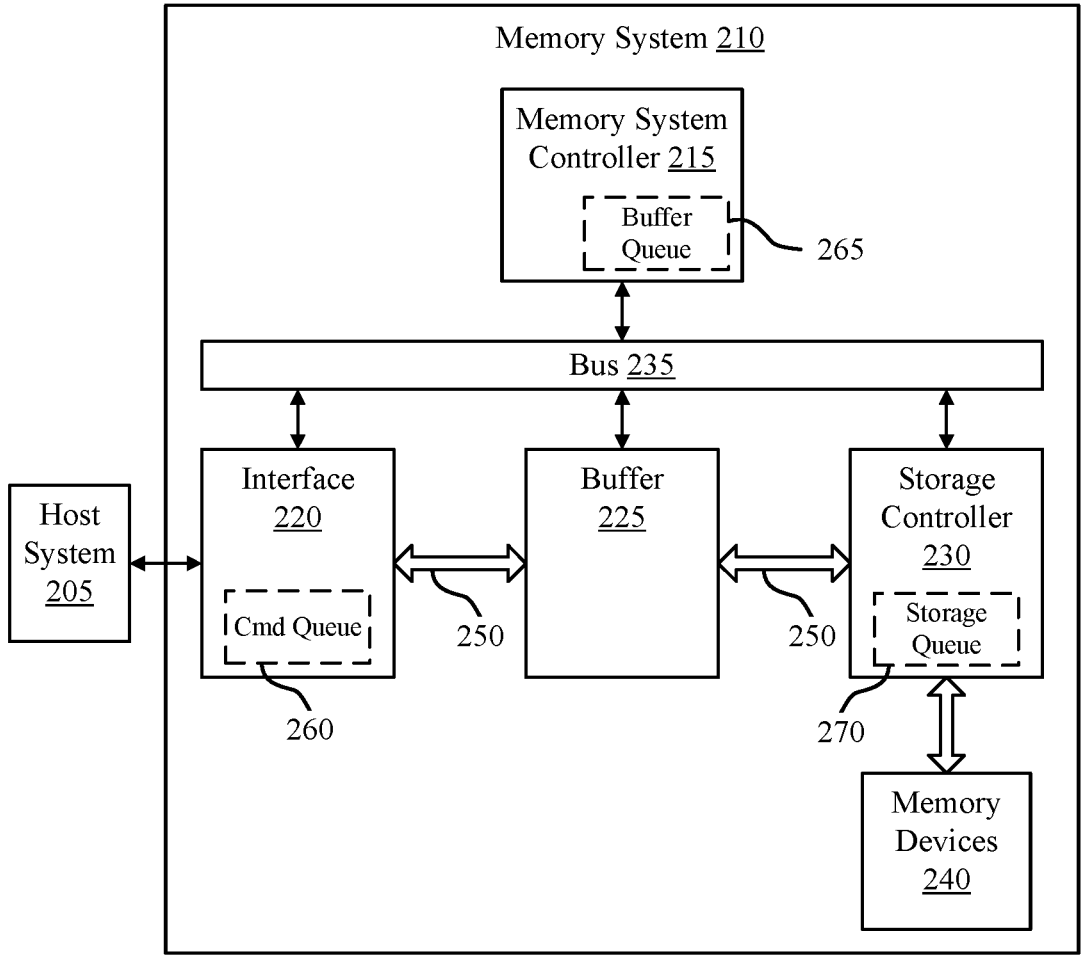
FIG. 2 illustrates an example of a system that supports transferring valid data using a system latch in accordance with examples as disclosed herein.

Features of the disclosure are initially described in the context of systems, devices, and circuits with reference to FIGS. 1 through 2. Features of the disclosure are described in the context of a data transfer diagram and a process flow with reference to FIGS. 3 and 4. These and other features of the disclosure are further illustrated by and described in the context of a block diagram and flowchart that relate to transferring valid data using a system latch with reference to FIGS. 5 and 6.

FIG. 1 illustrates an example of a system 100 that supports transferring valid data using a system latch in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations-which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support transferring valid data using a system latch. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In accordance with examples as described herein, transferring valid data using a system latch (e.g., a latch configured for temporarily storing valid data from source memory blocks) may ensure invalid data is not written to destination memory blocks (e.g., one or more blocks 170) of the memory system 110 without adversely impacting bandwidth and latency of the memory system 110. An improved copyback technique may include accessing source memory blocks (e.g., one or more blocks 170) of the memory system 110 and sensing valid data from the source memory blocks. The valid data may be stored to the system latch in an order according to the valid data sequentially sensed from the source memory blocks, regardless of an order of the source memory blocks. The system latch may store the valid data until a storage capacity of the system latch (e.g., 1 GB) is met or until all the valid data is sensed from the source memory blocks. Then, the valid data may be written from the system latch to the destination memory blocks. In some examples, the source memory blocks may include SLCs and the destination memory blocks may include QLCs, such that the valid data is folded (e.g., compressed) before writing the valid data to the destination memory blocks.

The improved copy-back technique described herein may prevent invalid data from being written to the destination memory blocks without using the memory system controller 115 (e.g., or another controller of the memory system 110), thereby preventing reduced usable bandwidth (e.g., for performing other operations) and increased latency otherwise associated with transferring valid data from source memory blocks to destination memory blocks (e.g., using an existing copy-back technique).

FIG. 2 illustrates an example of a system 200 that supports transferring valid data using a system latch in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM. RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230) may communicate with memory devices 240) directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270) are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In accordance with examples as described herein, transferring valid data using a system latch may ensure invalid data is not written to destination memory blocks of the memory system 210 without adversely impacting bandwidth and latency of the memory system 210. An improved copy-back technique may include accessing source memory blocks of the memory system 210 and sensing valid data from the source memory blocks. The valid data may be stored to the system latch in an order according to the valid data sequentially sensed from the source memory blocks, regardless of an order of the source memory blocks. The system latch may store the valid data until a storage capacity of the system latch is met or until all the valid data is sensed from the source memory blocks. Then, the valid data may be written from the system latch to the destination memory blocks. In some examples, the source memory blocks may include SLCs and the destination memory blocks may include QLCs, such that the valid data is folded (e.g., compressed) before writing the valid data to the destination memory blocks. The improved copy-back technique described herein may prevent invalid data from being written to the destination memory blocks without using the memory system controller 215 (e.g., or another controller of the memory system 210), thereby preventing reduced usable bandwidth (e.g., for performing other operations) and increased latency otherwise associated with transferring valid data from source memory blocks to destination memory blocks (e.g., using an existing copy-back technique).

FIG. 3 illustrates an example of a data transfer diagram 300 that supports transferring valid data using a system latch in accordance with examples as disclosed herein. The data transfer diagram 300 may illustrate techniques implemented at a memory system which may be an example of the memory system 110 or the memory system 210, as described with reference to FIGS. 1 and 2, respectively. In some cases, the memory system may transfer valid data from source memory blocks to destination memory blocks based on a system latch configured to store valid data. In such cases, transferring valid data using a system latch may ensure invalid data is not written to destination memory blocks of the memory system, thereby preventing reduced bandwidth and increased latency otherwise associated with transferring valid data from source memory blocks to destination memory blocks.

A memory system may include a set of source memory blocks 305 associated with a set of planes 310 (e.g., planes 310-a, 310-b, 310-c, and 310-d). The set of source memory blocks 305 may be associated with storing data to the memory system prior to transferring the data. For example, the set of source memory blocks 305 may store data associated with host access operations on the memory system. In some cases, the set of source memory blocks 305 may be associated with storing fragmented data, where valid data and invalid data are stored to source memory blocks 305 of the set of source memory blocks 305 in a discontinuous pattern. For example, a subset of source memory blocks 305 may store valid data and another subset of source memory blocks 305 may store invalid data, where the source memory blocks 305 of the subsets of source memory blocks 305 are noncontiguous (e.g., a pattern in which the source memory blocks 305 including valid data are sequentially mixed with the source memory blocks 305 including invalid data). In some examples, the set of source memory blocks 305 may include a set of SLCs, where each SLC is configured to store a single bit of data. In other examples, the set of source memory blocks 305 may include a set of QLCs, where each QLC is configured to store multiple bits of data (e.g., 4 bits).

The memory system may include a set of destination memory blocks 320 associated with a set of planes 310 (e.g., planes 310-e, 310-f, 310-g, and 310-h). In some examples, the set of planes 310 associated with the set of destination memory blocks 320 may also be associated with the set of source memory blocks 305, such that each plane 310 in the set of planes 310 may be associated with storing source memory blocks 305 and destination memory blocks 320. The set of destination memory blocks 320 may be associated with storing data in the memory system after transferring the data from the set of source memory blocks 305. In some cases, the set of destination memory blocks 320 may be associated with storing valid data from one or more system latches 325. In some examples, the set of destination memory blocks 320 may include a set of QLCs. In other examples, the set of destination memory blocks 320 may include a set of SLCs.

The memory system may include the one or more system latches 325, where each system latch may be configured to store valid data sensed from the set of source memory blocks 305. The one or more system latches 325 may be associated with storing the valid data prior to writing the valid data to the set of destination memory blocks 320. In some cases, each system latch 325 may be associated with a storage capacity for storing valid data, such that when a threshold associated with the storage capacity of a system latch 325 is satisfied (e.g., met), additional valid data may not be stored to the system latch 325. In some examples, when the threshold is satisfied, the memory system or the system latch 325 may begin writing the valid data from the system latch 325 to the set of destination memory blocks 320. In some cases, the one or more system latches 325 may be associated with storing the valid data for a duration associated with sensing the valid data from the set of source memory blocks 305, such that when a threshold associated with the duration is satisfied, the memory system or the one or more system latches 325 may begin writing the valid data from the one or more system latches 325 to the set of destination memory blocks 320. In some examples, the memory system or the one or more system latches 325 may begin writing the valid data to the set of destination memory blocks 320 based on sensing all of the valid data from the set of source memory blocks 305. In some examples, the memory system may include a bitmap to track the quantity of valid data stored to the one or more system latches 325.

The valid data may be sensed from the set of source memory blocks 305 prior to storing the valid data to the one or more system latches 325. In some cases, the valid data may be sensed from the set of source memory blocks 305 by first accessing the set of source memory blocks 305. The data in the set of source memory blocks 305 may be sensed in a row 315 (e.g., rows 315-*a* through 315-N) of source memory blocks 305 across the set of planes 310, such that data is sequentially sensed from the source memory blocks 305 across the set of planes 310 in the row 315 and then sequentially sensed from the source memory blocks 305 across the set of planes 310 in a next row 315. For example, data may be sensed from the source memory blocks 305 in a first row 315-*a* from a first plane 310-*a* to a last plane 310-*d*, and then sensed from the source memory blocks 305 in a second row 315-*b* from the first plane 310-*a* to the last plane 310-*d*. In some cases, sensing the valid data may include determining whether the data sequentially sensed from each source memory block is valid. In other cases, the memory system may sense the data from each source memory block 305 based on determining whether the data is valid. For example, the memory system may determine to sense the valid data across a first subset of the set of planes 310 and may determine to ignore (e.g., refrain from sensing) the invalid data across a second subset of the set of planes 310, where the first subset may not include invalid data and the second subset may not include valid data.

In some cases, the one or more system latches 325 may be configured to store valid data from the set of source memory blocks 305 in an order (e.g., sensing order, sequence, sensing sequence) in which valid data is sequentially sensed from the set of source memory blocks 305, regardless of an order of the set of source memory blocks 305. In such cases, valid data may be stored to the one or more system latches 325 according to the order in which the valid data is read from the source memory blocks 305 of the row 315, regardless of the plane 310 associated with the respective source memory block 305. For example, if a first source memory block 305 of the first row 315-*a* in the first plane 310-*a* does not have valid data, then the next valid data sensed from a subsequent source memory block 305 of the first row 315-*a* in a subsequent plane 310 or the next valid data sensed from a subsequent source memory block 305 of a subsequent row 315 (e.g., row 315-*b*) in a same plane 310 (e.g., the first plane 310-*a*) or a different plane 310 may be stored to a first position of a system latch 325. In such examples, the offset of the valid data in the system latch 325 may correspond to the order in which valid data is sensed across the set of planes 310 and down the rows 315. In some implementations, the order of the sensed valid data may be sequential or nonsequential according to the valid data across the set of planes 310.

In some cases, the valid data may be written from the one or more system latches 325 to the set of destination memory blocks 320. In such cases, valid data in the one or more system latches 325 may be written to a row 316 (e.g., rows 316-*a* through 316-N) of destination memory blocks 320 across the set of planes 310 (e.g., planes 310-*e*, 310-*f*, 310-*g*, and 310-*h*), such that data is sequentially written to the destination memory blocks 320 across the set of planes 310 in the row 316 and then sequentially written to the destination memory blocks 320 across the set of planes 310 in a next row 316. For example, data may be written to the destination memory blocks 320 in a first row 316-*a* from a first plane 310-*e* to a last plane 310-*h*, and then written to the destination memory blocks 320 in a second row 316-*b* from the first plane 310-*e* to the last plane 310-*h*.

In some cases where the set of source memory blocks 305 include SLCs and the set of destination memory blocks 320 include QLCs, writing the valid data to the set of destination memory blocks 320 may include copying the valid data in a format corresponding to the destination memory blocks 320. In such cases, the memory system may include four system latches 325 such that all the valid data from the set of source memory blocks 305 may be stored to the four system latches 325 and then copied to the set of destination memory blocks 320 in a format (e.g., according to a granularity) of the destination memory blocks 320. For example, because the set of destination memory blocks 320 may include QLCs, the valid data from the four system latches 325 may be compressed such that each destination memory block 320 may include valid data from four source memory blocks 305.

In some cases, the memory system may be configured to detect errors in the valid data (e.g., using a snap read) sensed from the set of source memory blocks 305 prior to storing the sensed valid data to the one or more system latches 325 or prior to writing the stored valid data from the one or more system latches 325 to the set of destination memory blocks 320. In some examples, the memory system may be configured to detect a quantity of errors in the valid data and store the valid data to the one or more system latches 325 or write the valid data to the set of destination memory blocks 320, based on determining the quantity of errors satisfies a threshold associated with a quantity of errors (e.g., an allowable quantity of errors).

In accordance with examples as described herein, sensing the valid data from the set of source memory blocks 305, storing the valid data to the one or more system latches 325, and then writing the valid data to the set of destination memory blocks 320 may be associated with an improved copy-back technique. In some cases, the improved copy-back technique may be associated with using less bandwidth of a memory system and preventing increased latency of the memory system otherwise associated with an existing copy-back technique.

Figure 4:
FIG. 4 illustrates an example of a process flow that supports transferring valid data using a system latch in accordance with examples as disclosed herein.

FIG. 4 illustrates an example of a process flow 400 that supports transferring valid data using a system latch in accordance with examples as disclosed herein. The process flow 400 may illustrate aspects or operations of the system 100 or the system 200, as described with reference to FIGS.

1 and 2, respectively. Additionally, the process flow 400 may illustrate operations of the data transfer diagram 300, as described with reference to FIG. 3. In the following description of the process flow 400, the methods, techniques, processes, and operations may be performed in different orders or at different times. Further, certain operations may be left out of the process flow 400, or other operations may be added to the process flow 400. The operations described herein may include sensing valid data from source memory blocks and writing the valid data to destination memory blocks using one or more system latches, thereby preventing reduced usable bandwidth and preventing increasing latency otherwise associated with transferring valid data between source memory blocks and destination memory blocks.

Aspects of the process flow 400 may be implemented by a controller which may be an example of memory system controller 115, as described with reference to FIG. 1. Additionally, or alternatively, aspects of the process flow 400 may be implemented as instructions stored in memory (e.g., firmware stored in a memory coupled with a memory system or a host system). For example, the instructions, when executed by a controller (e.g., the host system controller, the memory system controller, the multitenancy controller), may cause the controller to perform the operations of the process flow 400.

At 405, a source memory block of a set of source memory blocks may be accessed. The source memory block may be an example of a source memory block 305, as described with reference to FIG. 3. In some cases, the source memory block may be a first source block of a first row in a first plane of a set of planes associated with the set of source memory blocks. In some cases, the source memory block may be accessed as part of accessing the set of source memory blocks in an order across the set of planes in a respective row of the planes.

At 410, data may be sensed from the source memory block. For example, the data may be read from the source memory block according to the order of accessing the set of source memory blocks.

At 415, the data sensed from the source memory block may be determined (e.g., by the memory system) as invalid data or valid data. In some cases, the memory system may determine the data sensed from the source memory block is valid data, and the process flow 400 may continue to step 420. In other cases, the memory system may determine the data sensed from the source memory block is invalid data, and the process flow 400 may continue to step 435.

At 420, the valid data may be stored to a system latch of the memory system based on determining the data from the source memory block is valid data. The valid data may be sequentially stored to the system latch in a position of the system latch according to an order in which valid data is sequentially sensed from the set of source memory blocks. In some cases, the order of the valid data may be sequential based on the data in the set of source memory blocks being sensed in a continuous valid pattern across the set of planes and down the respective rows. In other cases, the order of the valid data may be nonsequential based on the data in the set of source memory blocks being sensed in a discontinuous valid pattern.

At 425, the memory system may determine if a storage capacity of the system latch has been filled based on storing the valid data from the source block to the system latch. For example, the memory system may determine if a threshold associated with the storage capacity of the system latch has been satisfied, where satisfying the threshold may be associated with indicating the system latch may not have additional storage capacity for storing additional valid data from the set of source memory blocks. In some cases, the threshold associated with the storage capacity of the system latch may have been satisfied based on storing the valid data from the source memory block to the system latch. In such cases, the system latch may not have additional storage capacity and the process flow 400 may continue to step 430. In some examples, all the valid data may have been sensed from the set of source memory blocks and the process flow 400 may continue to step 430. For example, a threshold associated with a duration for sensing all the valid data from the set of source memory blocks may have been satisfied, and the process flow 400 may continue to step 430. In other cases, the threshold associated with the storage capacity of the system latch may not have been satisfied based on storing the valid data from the source memory block to the system latch. In such cases, the system latch may have additional storage capacity and the process flow 400 may continue to step 435.

At 430, the valid data from the system latch may be written to a set of destination memory blocks. In some cases, the valid data may be written from the system latch to the set of destination memory blocks based on determining the threshold associated with the storage capacity of the system latch has been satisfied. In some cases, all of the valid data from the system latch may be written to the set of destination memory blocks. In other cases, the valid data from the system latch may be written to the set of destination memory blocks based on all the valid data being sensed from the set of source memory blocks. In some examples, the valid data may be written to the set of destination memory blocks according to an order in which the valid data was stored to the system latch. In some examples, the valid data may be written to the set of destination memory blocks according to a format (e.g., granularity) of the destination memory blocks. For example, if the set of source memory blocks include SLCs and the set of destination memory blocks include QLCs, writing the valid data may include copying (e.g., or folding) the valid data such that the valid data from four source memory blocks may be written to one destination memory block.

At 435, the next source memory block (e.g., sequentially) in the set of source memory blocks after the source memory block (e.g., the source memory block from step 405) may be accessed. In some cases, the next source memory block may be accessed based on determining the data in the source memory block is invalid. In some cases, the next source memory block may be accessed based on determining the threshold associated with the storage capacity of the system latch has not been satisfied.

At 440), data from the next source memory block may be sensed based on accessing the next source memory block. After sensing the data from the next source memory block, the process flow 400 may continue back to step 415 to determine if the data is valid.

In accordance with examples as described herein, the process flow 400 including sensing the valid data from the set of source memory blocks, storing the valid data to the one or more system latches, and then writing the valid data to the set of destination memory blocks may be associated with an improved copy-back technique. In some cases, the improved copy-back technique may be associated with using less bandwidth of a memory system and preventing increased latency of the memory system otherwise associated with an existing copy-back technique.

Figure 5:
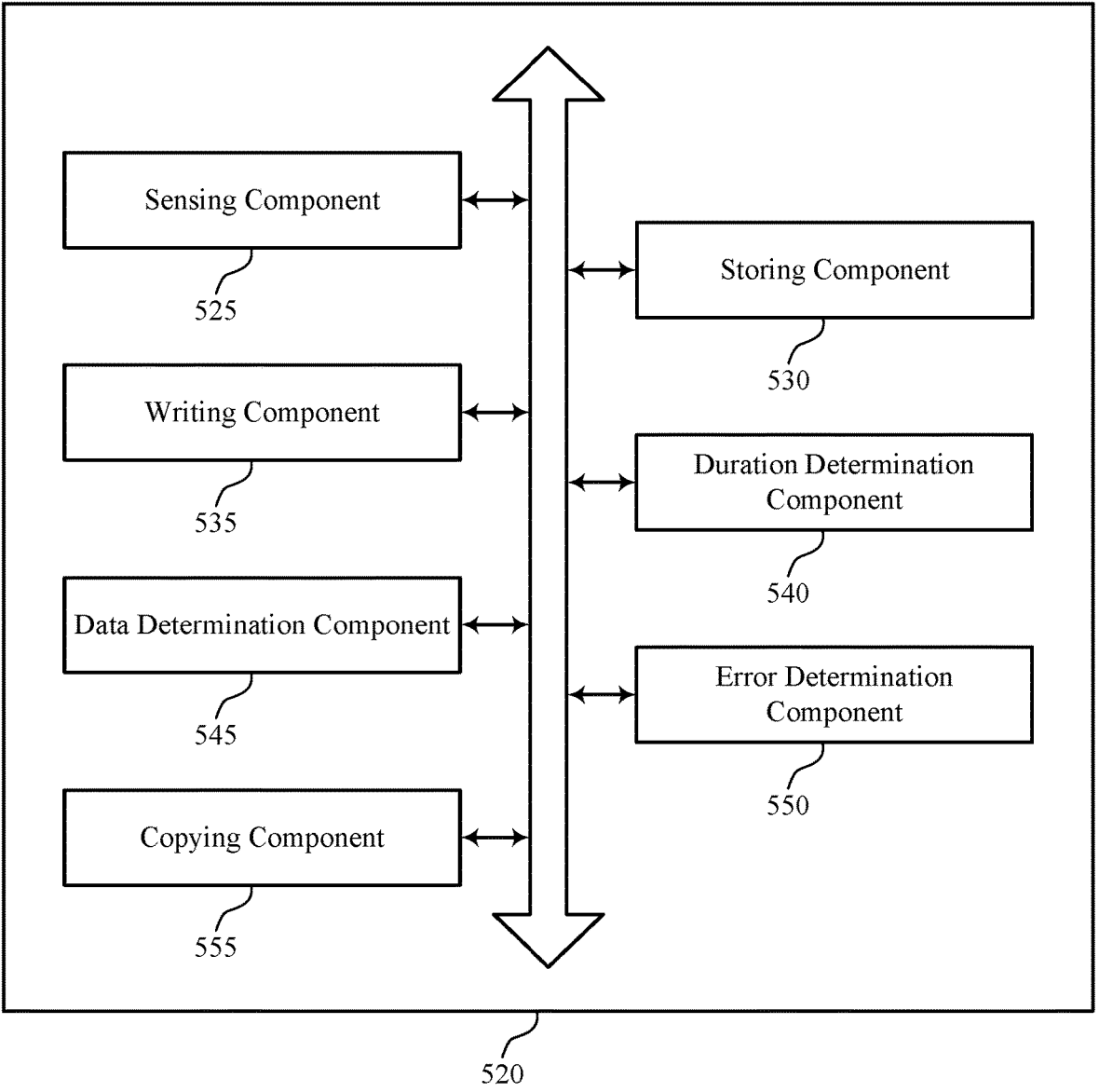
FIG. 5 illustrates a block diagram of a memory system that supports transferring valid data using a system latch in accordance with examples as disclosed herein.

FIG. 5 illustrates a block diagram 500 of a memory system 520 that supports transferring valid data using a system latch in accordance with examples as disclosed herein. The memory system 520 may be an example of aspects of a memory system as described with reference to FIGS. 1 through 4. The memory system 520, or various components thereof, may be an example of means for performing various aspects of transferring valid data using a system latch as described herein. For example, the memory system 520 may include a sensing component 525, a storing component 530, a writing component 535, a duration determination component 545, a data determination component 550, an error component 555, a copying component 560, or any combination thereof. Each of these components may communicate, directly or indirectly, with one another (e.g., via one or more buses).

The sensing component 525 may be configured as or otherwise support a means for sensing valid data across a first set of planes associated with a first set of memory blocks of a non-volatile memory system. The storing component 530 may be configured as or otherwise support a means for storing, in response to sensing the valid data, the valid data to a latch of the non-volatile memory system based at least in part on an order of the sensed valid data across the first set of planes. The writing component 535 may be configured as or otherwise support a means for writing the stored valid data across a second set of planes associated with a second set of memory blocks of the non-volatile memory system based at least in part on the order of the sensed valid data across the first set of planes.

In some examples, the duration determination component 545 may be configured as or otherwise support a means for determining a duration for sensing the valid data across the first set of planes associated with the first set of memory blocks of the non-volatile memory system, where writing the stored valid data across the second set of planes associated with the second set of memory blocks of the non-volatile memory system is based at least in part on the duration satisfying a threshold.

In some examples, to support sensing the valid data, the data determination component 550 may be configured as or otherwise support a means for determining to sense the valid data across the first subset of the first set of planes associated with the first set of memory blocks of the non-volatile memory system.

In some examples, the data determination component 550 may be configured as or otherwise support a means for determining to ignore the invalid data across the second subset of first set of planes associated with the first set of memory blocks of the non-volatile memory system.

In some examples, the order of the sensed valid data across the first set of planes associated with the first set of memory blocks of the non-volatile memory system is sequential.

In some examples, the order of the sensed valid data across the first set of planes associated with the first set of memory blocks of the non-volatile memory system is non-sequential.

In some examples, the sensed valid data is stored in sequential positions to the latch based at least in part on an order in which the sensed valid data is sequentially sensed.

In some examples, the data determination component 550 may be configured as or otherwise support a means for determining whether a quantity of the sensed valid data stored to the latch satisfies a threshold associated with a storage capacity of the latch, where writing the stored valid data across the second set of planes associated with the second set of memory blocks of the non-volatile memory system is based at least in part on determining that the quantity of the sensed valid data stored to the latch satisfies the threshold associated with the storage capacity of the latch.

In some examples, the error component 555 may be configured as or otherwise support a means for detecting a quantity of errors in the sensed valid data, where writing the stored valid data across the second set of planes associated with the second set of memory blocks of the non-volatile memory system is based at least in part on the quantity of errors in the sensed valid data.

In some examples, the error component 555 may be configured as or otherwise support a means for determining whether the quantity of errors in the sensed valid data satisfies a threshold, where writing the stored valid data across the second set of planes associated with the second set of memory blocks of the non-volatile memory system is based at least in part on determining that the quantity of errors in the sensed valid data satisfies the threshold.

In some examples, to support writing the stored valid data across the second set of planes associated with the second set of memory blocks of the non-volatile memory system, the copying component 560 may be configured as or otherwise support a means for copying the stored valid data based at least in part on a format for storing stored valid data across the second set of planes associated with the second set of memory blocks of the non-volatile memory system.

In some examples, the first set of memory blocks includes a set of source memory blocks and the second set of memory blocks includes a set of destination memory blocks.

In some examples, the set of source memory blocks includes wherein the set of source memory blocks includes a set of single-level memory cells, a set of quad-level memory cells, or a set of triple-level memory cells, and wherein the set of destination memory blocks includes the set of quad-level memory cells, the set of quad-level memory cells, or the set of triple-level memory cells.

In some examples, the set of source memory blocks are different than the set of destination memory blocks.

FIG. 6 illustrates a flowchart showing a method 600 that supports transferring valid data using a system latch in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include sensing valid data across a first set of planes associated with a first set of memory blocks of a non-volatile memory system. The operations of 605 may be performed in accordance with examples as disclosed herein. In some examples, aspects of the operations of 605 may be performed by a sensing component 525 as described with reference to FIG. 5.

At 610, the method may include storing, in response to sensing the valid data, the valid data to a latch of the non-volatile memory system based at least in part on an order of the sensed valid data across the first set of planes. The operations of 610 may be performed in accordance with examples as disclosed herein. In some examples, aspects of the operations of 610 may be performed by a storing component 530 as described with reference to FIG. 5.

At 615, the method may include writing the stored valid data across a second set of planes associated with a second set of memory blocks of the non-volatile memory system based at least in part on the order of the sensed valid data across the first set of planes. The operations of 615 may be performed in accordance with examples as disclosed herein. In some examples, aspects of the operations of 615 may be performed by a writing component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for sensing valid data across a first set of planes associated with a first set of memory blocks of a non-volatile memory system: storing, in response to sensing the valid data, the valid data to a latch of the non-volatile memory system based at least in part on an order of the sensed valid data across the first set of planes: and writing the stored valid data across a second set of planes associated with a second set of memory blocks of the non-volatile memory system based at least in part on the order of the sensed valid data across the first set of planes.

Aspect 2: The method, apparatus, or non-transitory computer-readable medium of aspect 1, further including operations, features, circuitry, logic, means, or instructions, or any combination thereof for determining a duration for sensing the valid data across the first set of planes associated with the first set of memory blocks of the non-volatile memory system, where writing the stored valid data across the second set of planes associated with the second set of memory blocks of the non-volatile memory system is based at least in part on the duration satisfying a threshold.

Aspect 3: The method, apparatus, or non-transitory computer-readable medium of any of aspects 1 through 2, where sensing the valid data includes operations, features, circuitry, logic, means, or instructions, or any combination thereof for determining to sense the valid data across the first subset of the first set of planes associated with the first set of memory blocks of the non-volatile memory system.

Aspect 4: The method, apparatus, or non-transitory computer-readable medium of aspect 3, further including operations, features, circuitry, logic, means, or instructions, or any combination thereof for determining to ignore the invalid data across the second subset of first set of planes associated with the first set of memory blocks of the non-volatile memory system.

Aspect 5: The method, apparatus, or non-transitory computer-readable medium of any of aspects 1 through 4, where the order of the sensed valid data across the first set of planes associated with the first set of memory blocks of the non-volatile memory system is sequential.

Aspect 6: The method, apparatus, or non-transitory computer-readable medium of any of aspects 1 through 5, where the order of the sensed valid data across the first set of planes associated with the first set of memory blocks of the non-volatile memory system is nonsequential.

Aspect 7: The method, apparatus, or non-transitory computer-readable medium of any of aspects 1 through 6, where the sensed valid data is stored in sequential positions to the latch based at least in part on an order in which the sensed valid data is sequentially sensed.

Aspect 8: The method, apparatus, or non-transitory computer-readable medium of any of aspects 1 through 7, further including operations, features, circuitry, logic, means, or instructions, or any combination thereof for determining whether a quantity of the sensed valid data stored to the latch satisfies a threshold associated with a storage capacity of the latch, where writing the stored valid data across the second set of planes associated with the second set of memory blocks of the non-volatile memory system is based at least in part on determining that the quantity of the sensed valid data stored to the latch satisfies the threshold associated with the storage capacity of the latch.

Aspect 9: The method, apparatus, or non-transitory computer-readable medium of any of aspects 1 through 8, further including operations, features, circuitry, logic, means, or instructions, or any combination thereof for detecting a quantity of errors in the sensed valid data, where writing the stored valid data across the second set of planes associated with the second set of memory blocks of the non-volatile memory system is based at least in part on the quantity of errors in the sensed valid data.

Aspect 10: The method, apparatus, or non-transitory computer-readable medium of aspect 9, further including operations, features, circuitry, logic, means, or instructions, or any combination thereof for determining whether the quantity of errors in the sensed valid data satisfies a threshold, where writing the stored valid data across the second set of planes associated with the second set of memory blocks of the non-volatile memory system is based at least in part on determining that the quantity of errors in the sensed valid data satisfies the threshold.

Aspect 11: The method, apparatus, or non-transitory computer-readable medium of any of aspects 1 through 10, where writing the stored valid data across the second set of planes associated with the second set of memory blocks of the non-volatile memory system includes operations, features, circuitry, logic, means, or instructions, or any combination thereof for copying the stored valid data based at least in part on a format for storing stored valid data across the second set of planes associated with the second set of memory blocks of the non-volatile memory system.

Aspect 12: The method, apparatus, or non-transitory computer-readable medium of any of aspects 1 through 11, where the first set of memory blocks includes a set of source memory blocks and the second set of memory blocks includes a set of destination memory blocks.

Aspect 13: The method, apparatus, or non-transitory computer-readable medium of aspect 12, where the set of source memory blocks includes wherein the set of source memory blocks comprises a set of single-level memory cells, a set of quad-level memory cells, or a set of triple-level memory cells, and wherein the set of destination memory blocks includes the set of quad-level memory cells, the set of quad-level memory cells, or the set of triple-level memory cells.

Aspect 14: The method, apparatus, or non-transitory computer-readable medium of any of aspects 12 through 13, where the set of source memory blocks are different than the set of destination memory blocks.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 15: A non-volatile memory system, including: a controller associated with the non-volatile memory system, where the controller is configured to cause the memory system to: sense valid data across a first set of planes associated with a first set of memory blocks of the non-volatile memory system: store, in response to sensing the valid data, the valid data to a latch of the non-volatile memory system based at least in part on an order of the sensed valid data across the first set of planes associated with the first set of memory blocks of the non-volatile memory system: and write the stored valid data across a second set of planes associated with a second set of memory blocks of the non-volatile memory system based at least in part on the order of the sensed valid data across the first set of planes associated with the first set of memory blocks of the non-volatile memory system.

Aspect 16: The non-volatile memory system of aspect 15, where the controller is further configured to cause the non-volatile memory system to: determine a duration for sensing the valid data across the first set of planes associated with the first set of memory blocks of the non-volatile memory system, where to write the stored valid data across the second set of planes associated with the second set of memory blocks of the non-volatile memory system is based at least in part on the duration satisfying a threshold.

Aspect 17: The non-volatile memory system of any of aspects 15 through 16, where a first subset of the first set of planes associated with the first set of memory blocks of the non-volatile memory system includes the valid data and a second subset of the first set of planes associated with the first set of memory blocks of the non-volatile memory system includes invalid data, and where the controller is further configured to cause the non-volatile memory system to: determine to sense the valid data across the first subset of the first set of planes associated with the first set of memory blocks of the non-volatile memory system: and determine to ignore the invalid data across the second subset of first set of planes associated with the first set of memory blocks of the non-volatile memory system.

Aspect 18: The non-volatile memory system of any of aspects 15 through 17, where the controller is further configured to cause the non-volatile memory system to: determine whether a quantity of the sensed valid data stored to the latch satisfies a threshold associated with a storage capacity of the latch, where to write the stored valid data across the second set of planes associated with the second set of memory blocks of the non-volatile memory system is based at least in part on determining that the quantity of the sensed valid data stored to the latch satisfies the threshold associated with the storage capacity of the latch.

Aspect 19: The non-volatile memory system of any of aspects 15 through 18, where the controller is further configured to cause the non-volatile memory system to: detect a quantity of errors in the sensed valid data, where to write the stored valid data across the second set of planes associated with the second set of memory blocks of the non-volatile memory system is based at least in part on the quantity of errors in the sensed valid data.

Aspect 20: The non-volatile memory system of any of aspects 15 through 19, where the controller is further configured to cause the non-volatile memory system to: copy the stored valid data based at least in part on a format for storing stored valid data across the second set of planes associated with the second set of memory blocks of the non-volatile memory system.

An apparatus is described. The following provides an overview of aspects of the apparatus as described herein:

Aspect 21: A non-volatile memory system, including: a first set of memory blocks configured to store valid data, invalid data, or both: a latch configured to store the valid data from the first set of memory blocks in accordance with an order of the valid data sensed by the memory system and irrespective of the invalid data: and a second set of memory blocks configured to store the valid data from the latch based at least in part on the order of the valid data sensed by the memory system.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on." "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped. e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

sensing valid data across a first set of planes associated with a first set of memory blocks of a non-volatile memory system, the valid data comprising first valid data stored at a first plane in the first set of planes and comprising second valid data stored at a second plane in the first set of planes;

storing, in response to sensing the valid data, the valid data to a latch of the non-volatile memory system, wherein the first valid data and the second valid data are stored in sequential positions of the latch based at least in part on a read order of the first valid data and the second valid data;

determining, based at least in part on storing the valid data to the latch, whether a quantity of the valid data stored to the latch satisfies a threshold associated with a storage capacity of the latch and whether the valid data stored to the latch has fewer than a threshold quantity of errors; and writing, based at least in part on determining that the quantity of the valid data stored to the latch satisfies the threshold associated with the storage capacity of the latch and on determining that the valid data to the latch has fewer than the threshold quantity of errors, the valid data across a second set of planes associated with a second set of memory blocks of the non-volatile memory system based at least in part on the read order of the first plane and the second plane.

2. The method of claim 1, further comprising:

determining a duration for sensing the valid data across the first set of planes associated with the first set of memory blocks of the non-volatile memory system, wherein writing the valid data across the second set of planes associated with the second set of memory blocks of the non-volatile memory system is based at least in part on the duration satisfying a threshold.

3. The method of claim 1, wherein a first subset of the first set of memory blocks of the non-volatile memory system comprises the valid data and a second subset of the first set of memory blocks of the non-volatile memory system comprises invalid data, and wherein sensing the valid data comprises:

determining to sense the valid data across the first subset of the first set of memory blocks of the non-volatile memory system.

4. The method of claim 3, further comprising:

determining to ignore the invalid data across the second subset of the first set of memory blocks of the non-volatile memory system.

5. The method of claim 1, wherein an order of the valid data across the first set of planes associated with the first set of memory blocks of the non-volatile memory system is sequential.

6. The method of claim 1, wherein an order of the valid data across the first set of planes associated with the first set of memory blocks of the non-volatile memory system is nonsequential.

7. The method of claim 1, wherein writing the valid data across the second set of planes associated with the second set of memory blocks of the non-volatile memory system comprises:

copying the valid data based at least in part on a format for storing data across the second set of planes associated with the second set of memory blocks of the non-volatile memory system.

8. The method of claim 1, wherein the first set of memory blocks comprises a set of source memory blocks and the second set of memory blocks comprises a set of destination memory blocks.

9. The method of claim 8, wherein the set of source memory blocks comprises a set of single-level memory cells, a set of quad-level memory cells, or a set of triple-level memory cells, and wherein the set of destination memory blocks comprises the set of single-level memory cells, the set of quad-level memory cells, or the set of triple-level memory cells.

10. The method of claim 9, wherein the set of source memory blocks are different than the set of destination memory blocks.

11. A non-volatile memory system, comprising:

a controller associated with the non-volatile memory system, wherein the controller is configured to cause the non-volatile memory system to:

sense valid data across a first set of planes associated with a first set of memory blocks of the non-volatile memory system, the valid data comprising first valid data stored at a first plane in the first set of planes and comprising second valid data stored at a second plane in the first set of planes;

store, in response to sensing the valid data, the valid data to a latch of the non-volatile memory system, wherein the first valid data and the second valid data are stored in sequential positions of the latch based at least in part on a read order of the first valid data and the second valid data;

determining, based at least in part on storing the valid data to the latch, whether a quantity of the valid data stored to the latch satisfies a threshold associated with a storage capacity of the latch and whether the valid data in the latch has fewer than a threshold quantity of errors; and write, based at least in part on determining that the quantity of the valid data stored to the latch satisfies the threshold associated with the storage capacity of the latch and on determining that the valid data has fewer than the threshold quantity of errors, the valid data across a second set of planes associated with a second set of memory blocks of the non-volatile memory system based at least in part on the read order of the first plane and the second plane.

12. The non-volatile memory system of claim 11, wherein the controller is further configured to cause the non-volatile memory system to:

determine a duration for sensing the valid data across the first set of planes associated with the first set of memory blocks of the non-volatile memory system, wherein writing the valid data across the second set of planes associated with the second set of memory blocks of the non-volatile memory system is based at least in part on the duration satisfying a threshold.

13. The non-volatile memory system of claim 11, wherein a first subset of the first set of memory blocks of the non-volatile memory system comprises the valid data and a second subset of the first set of memory blocks of the non-volatile memory system comprises invalid data, and wherein the controller is further configured to cause the non-volatile memory system to:

determine to sense the valid data across the first subset of the first set of memory blocks of the non-volatile memory system; and determine to ignore the invalid data across the second subset of the first set of memory blocks of the non-volatile memory system.

14. A non-transitory computer-readable medium storing code, the code comprising instructions executable by a processor to:

sense valid data across a first set of planes associated with a first set of memory blocks of a non-volatile memory system, the valid data comprising first valid data stored at a first plane in the first set of planes and comprising second valid data stored at a second plane in the first set of planes;

store, in response to sensing the valid data, the valid data to a latch of the non-volatile memory system, wherein the first valid data and the second valid data are stored in sequential positions of the latch based at least in part on a read order of the first valid data and the second valid data;

determine, based at least in part on storing the valid data to the latch, whether a quantity of the valid data stored to the latch satisfies a threshold associated with a storage capacity of the latch and whether the valid data in the latch has fewer than a threshold quantity of errors; and write, based at least in part on determining that the quantity of the valid data stored to the latch satisfies the threshold associated with the storage capacity of the latch and on determining that the valid data has fewer than the threshold quantity of errors, the valid data across a second set of planes associated with a second set of memory blocks of the non-volatile memory system based at least in part on the read order of the first plane and the second plane.

\* \* \* \* \*